(12) United States Patent
Shemeta

(10) Patent No.: US 8,240,960 B2
(45) Date of Patent: Aug. 14, 2012

(54) DEVICE FOR PRODUCING PRECISE COUNTERSINKING IN DRILLED HOLES

(75) Inventor: Paul Joseph Shemeta, Seattle, WA (US)

(73) Assignee: West Coast Industries, Inc., Shoreline, WA (US)

( * ) Notice: Subject to any disclaimer, the term of this patent is extended or adjusted under 35 U.S.C. 154(b) by 1020 days.

(21) Appl. No.: 12/231,257

(22) Filed: Aug. 29, 2008

(65) Prior Publication Data

US 2010/0054876 A1 Mar. 4, 2010

(51) Int. Cl.
*B23B 45/14* (2006.01)

(52) U.S. Cl. ............... 408/16; 408/72 R; 408/241 S

(58) Field of Classification Search ............ 408/16, 408/72 R, 241 S; 409/218; B23B 45/14
See application file for complete search history.

(56) References Cited

U.S. PATENT DOCUMENTS

| | | | | |
|---|---|---|---|---|
| 4,538,943 A | * | 9/1985 | Clifton et al. | 408/14 |
| 4,647,260 A | * | 3/1987 | O'Hara et al. | 408/241 S |
| 4,693,656 A | * | 9/1987 | Guthrie | 411/433 |
| 4,770,573 A | * | 9/1988 | Monobe | 409/182 |
| 5,096,342 A | * | 3/1992 | Blankenship et al. | 408/112 |
| 5,380,132 A | * | 1/1995 | Parks | 408/113 |
| 5,601,387 A | * | 2/1997 | Sanford et al. | 408/113 |
| 5,746,552 A | * | 5/1998 | Tsui et al. | 408/72 B |
| 5,881,613 A | * | 3/1999 | Han | 81/429 |
| 6,547,013 B2 | * | 4/2003 | Riedl et al. | 173/132 |
| 6,872,036 B2 | * | 3/2005 | Linderholm | 409/200 |
| 7,210,881 B2 | * | 5/2007 | Greenberg | 408/202 |
| 7,261,499 B2 | * | 8/2007 | Mathis et al. | 408/202 |
| 7,607,871 B1 | * | 10/2009 | Nelson | 408/113 |
| 7,635,242 B2 | * | 12/2009 | Jeon et al. | 409/138 |
| 2010/0215450 A1 | * | 8/2010 | Santamarina et al. | 408/113 |

* cited by examiner

Primary Examiner — Eric A Gates
(74) Attorney, Agent, or Firm — Mark Zovko

(57) ABSTRACT

A depth stop attached to a drill for producing precise countersinking in drilled holes. The depth stop produces an accurate and precise countersink in drilled holes by limiting the depth to which a drill bit can drill through a work piece. An audible click occurs for every 7.5 micron change in depth in the preferred embodiment. The depth stop is configured such that attempts to over tighten the lock screw which fixes the depth amount will not damage or deflect the working parts of the device thereby producing accurate and repeatable results.

9 Claims, 6 Drawing Sheets

DEVICE FOR PRODUCING PRECISE COUNTERSINKING IN DRILLED HOLES

BACKGROUND OF THE INVENTION

1. Field of the Invention

This invention relates to a depth stop for a drill, and more particularly to a depth stop device which attaches to a drill used in drilling holes in aircraft parts which insures a precise countersink of these holes.

2. Description of the Prior Art

In most traditional manufacturing processes, manipulation and processing of products are typically accomplished manually by workers. In the case of modern airplane manufacturing, this manual manipulation and processing frequently includes manually drilling a multitude of holes through titanium and the like. The accuracy of these holes can be highly dependent upon the skill of the worker. It is also necessary, in many applications, to prepare these holes with countersunk sections to enable a fastener to lie generally flush with the surface of the material. Especially in the assembly of aircraft parts, such as wings, numerous holes are required to be drilled. These drilled holes must be precisely countersunk. If they are too deep, for example, structural integrity becomes compromised and cost of producing the parts soar. The fasteners must fit flush to the material surface, and when an improperly drilled hole, meaning that the countersink is too deep, for example, occurs, a significant problem is created, which results in penalties for the manufacturer. Simply stated, a drill which included a device to insure a precise countersink to holes drilled in aircraft parts requiring a countersink, that did not depend on any particular skill of the operator of the drill would be most desirable. To this end, the prior art has produced depth stop embodiments which limit the depth within the work piece that the drill bit can travel. For illustration, a typical such device can be seen in U.S. Pat. No. 6,514,018 issued to Martinez et al. This device shows an axially oriented tightening screw which engages a sleeve. The sleeve ultimately guides the drill bit to the desired depth within the work piece, being held in place relative to the moving drill bit by the tightening screw. This particular depth stop embodiment has inherent disadvantages which are magnified when the depth of a countersunk hole, for example, must be extremely precise and repeatable. In the first place, in the manual tools suchs as drills, it is desirable that the tool be as light in weight as possible, and, of course this would also include any device attached to the drill such as a depth stop. The sleeve, therefore, that would sense the work piece and limit drilling depth is preferably has a relatively thin wall. In the common arrangement, as the above mentioned patent is an example, the sleeve would be held in place with a screw. The screw is tightened by the operator of the drill once the proper depth of the hole to be drilled is determined. The problems that can occur include deflection of the sleeve due to the force of the screw on the sleeve especially if the screw is "overtightened" by the operator. Deflection of the sleeve which controls the depth of the drilled hole will ultimately result in a lack of precision in the depth stop device. As the precision requirements increase, the deflection issue further comes to the forefront, with the ideal being no deflection of the sleeve while it is held in place and controlling the depth of the drilled hole. Even a slight misalignment of the sleeve can lead to improper countersunk holes in an aircraft part which can result in defective assembly. Over time, even with the most careful and skilled drill operators, the depth stop device shown in the above mentioned United States patent will result in manufacturing problems due to deflection of the sleeve. These problems will occur sooner rather than later as the necessary degree of precision in countersink holes increases in a particular application.

The present invention provides a solution to the problems outlined above in the prior art, by presenting a depth stop device which allows the drill to produce repeatable, precise countersunk holes in aircraft parts without relying on an unusual degree of skill by the drill operator.

SUMMARY OF THE INVENTION

In general terms, the invention disclosed herein presents a novel device, namely, a depth stop for use with a drill. It is contemplated that the disclosed depth stop is especially valuable in situations requiring that the drilled hole be precise with respect to its depth. This type of application occurs, for example, in the aircraft industry in the assembly of aircraft parts. More specifically, many holes having a countersink feature are needed to be drilled during manufacture. These countersunk holes, if not drilled to exacting specifications with respect to depth, will increase the cost of manufacture of the aircraft part dramatically. Further, it is desirable in this application to provide a device which prevents an operator of the drill from inadvertently or accidentally damaging the depth stop during the procedure of fixing the depth stop at a predetermined level. In other words, the depth stop will need to be secured or fixed relative to the drill prior to use of the drill. It is critical that the locking means holding the depth stop in place during drilling is of a nature that will not cause misalignment or damage to the device in any way. The operator, using the present invention, is prevented from tightening the depth sensing part of the device to a point which will cause inaccuracy in later usage of the depth stop.

The depth stop of the present invention includes a tubular member or inner sensing sleeve, which at one end during use, contacts the work piece to be drilled. The inner sensing sleeve has grooves which partially extend over its outer surface. The purpose of these grooves will be discussed subsequently. The inner sensing sleeve has external fine pitched thread which screw into a second tubular part or outer portion of the sensing sleeve concentric with the inner sensing sleeve. The outer portion of the sensing sleeve has internal threads matching the threads of the inner sensing sleeve. The inner sensing sleeve is adjustable within the outer portion of the sensing sleeve by rotation of the inner sleeve. A lock screw and sensing sleeve anti-rotational member is provided which fix the inner sensing sleeve relative to the outer portion of the sensing sleeve. The sensing sleeve anti-rotational member has a set of teeth extending axially therefrom which engage in the grooves of the inner sensing sleeve to fix the inner sensing sleeve in place during use of the device. The lock screw has external threads which engage an internally threaded aperture of the outer portion of the sensing sleeve. The threaded aperture extends radially from the outer portion of the sensing sleeve. A spring is located between the lock screw and the sensing sleeve anti-rotational member, resting over protrusions of the lock screw and sensing sleeve anti-rotational member. As the lock screw is rotated, the sensing sleeve anti-rotational member moves toward the inner sensing sleeve due to the presence of the spring. Ultimately, when the lock screw is rotated to a locked position, meaning that the inner sensing sleeve is prevented from any axially movement relative to the outer portion of the sensing sleeve, the teeth of the sensing sleeve anti-rotational member engage the grooves of the inner sensing sleeve preventing rotation of the inner sensing sleeve relative to the outer portion of the sensing sleeve. The inner sensing sleeve is locked in position in this configuration as the teeth of the sensing sleeve anti-rotational member can move slightly axially but not enough to cause disengagement from the grooves of the inner sensing sleeve. The travel of the drill bit into the work piece thereby can be limited as one end of the inner sensing sleeve contacts the work piece. The inner sensing sleeve can be unlocked relative to the outer portion of the sensing sleeve by rotation of the lock screw in the opposite direction allowing the teeth of the sensing sleeve anti-rotational member to completely disengage from the grooves of the inner sensing sleeve.

In the above described configuration, it should be noted that the force applied to the inner sensing sleeve by the lock screw is modulated due to the presence of the spring between the sensing sleeve anti-rotational member and the lock screw. The teeth of the sensing sleeve anti-rotational member fit into the grooves of the inner sensing sleeve and prevent rotation of the inner sensing sleeve, but only minimal pressure is transmitted to the inner sensing sleeve. The inner sensing sleeve, therefore, cannot be inadvertently deflected or in any way damaged during the locking process regardless of how tight the lock screw is made. Further, the lock screw has a shoulder which contacts the threaded aperture when the lock screw is fully tightened preventing further movement of the outer portion of the lock screw within the threaded aperture. When fully tightened, the teeth of the sensing sleeve anti-rotational member cannot put significant pressure on the inner sensing sleeve and potentially damage it, nor can the teeth back out far enough to allow rotation of the inner sensing sleeve. The inner sensing sleeve, and therefore the depth, is set in place with minimal force on the inner sensing sleeve. The inner sensing sleeve is not "loaded up" with force from a lock screw which can produce mechanical misalignment or deflection resulting in the inability of the device to produce accuracy. To adjust the depth of the inner sensing sleeve relative to the drill and work piece, the lock screw is rotated to an open position allowing the inner sensing sleeve to be rotated inwardly or outwardly to the desired depth of the particular application. When the inner sensing sleeve is rotated in this manner, the spring located between the lock screw and the sensing sleeve anti-rotational member causes an audible click as the teeth of the sensing sleeve anti-rotational member slip over the grooves of the inner sensing sleeve thereby signaling a change in depth. In the preferred embodiment of the invention, the device can be set up so that the audible click occurs once for each 7.5 microns of depth change. This audio cue greatly assists the operator in arriving at the desired predetermined depth. The depth stop device can be attached to the end of a drill. Preferably, the drill would have cavities which can receive pins extending from longitudinally from the depth stop device. An adjustable clamping band can radially secure the depth stop device to the end of the drill when the pins are disposed in the aforementioned cavities.

It is, therefore, an object of the present invention to provide a depth stop device which allows the precise drilling of countersunk holes.

Another object of the present invention is to provide a depth stop device having a sensing sleeve which cannot be misaligned or damaged by the locking means of the device.

A further object of the present invention is to provide a depth stop device for use in drilling countersunk holes which can repeatedly produce holes of a precise depth.

Yet another object of the present invention is to provide a depth stop device having a sensing sleeve fixed in position by a locking screw which cannot be misaligned or deflected by over tightening the locking screw.

These and other objects and advantages will become more apparent from the following detailed description when taken in conjunction with the attached drawings.

BRIEF DESCRIPTION OF THE FIGURES

FIG. 1b is a cross sectional view through line B-B of FIG. 1a.

FIG. 4b is a cross sectional view taken through line B-B of FIG. 4a.

DETAILED DESCRIPTION OF THE PREFERRED EMBODIMENT

Figure 1A:
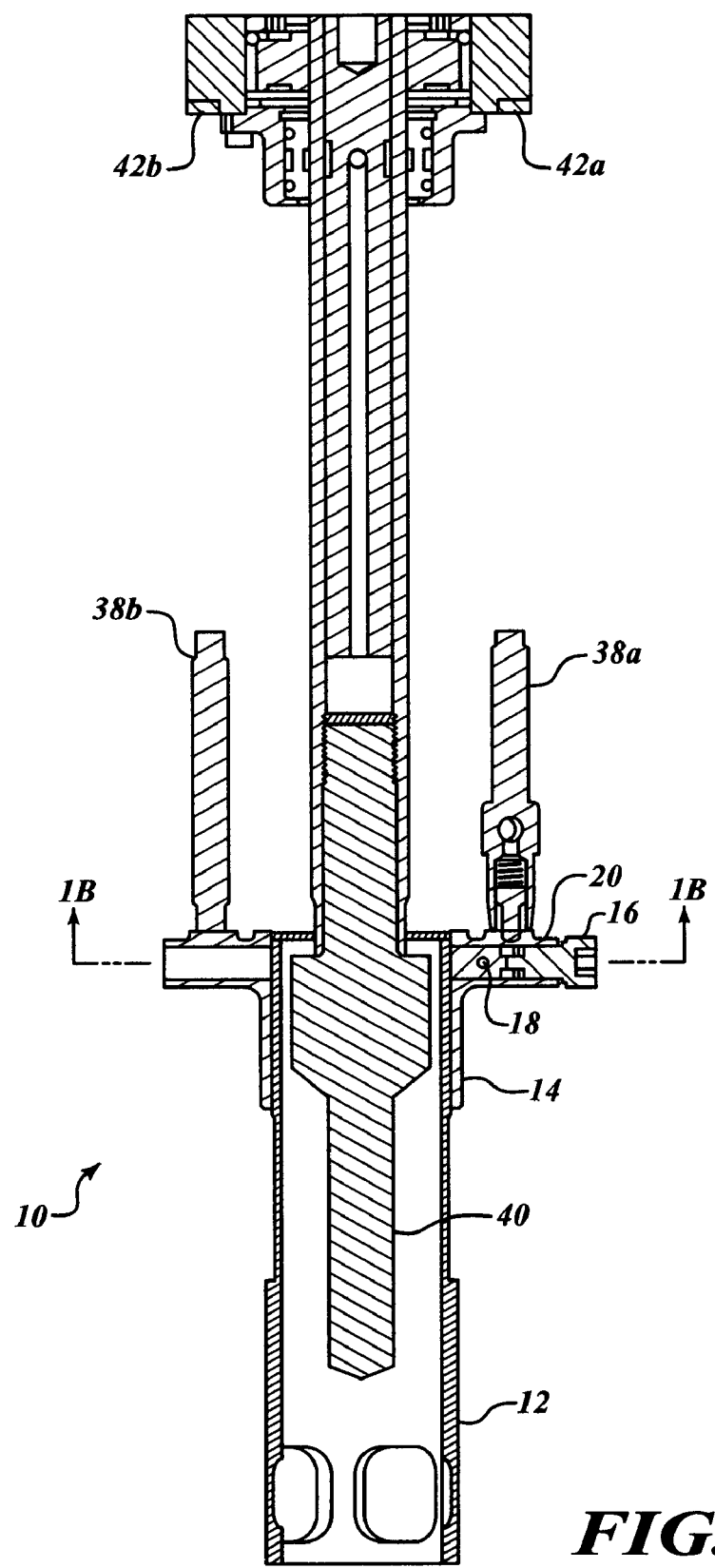
FIG. 1a is an elevation view partially in cross section of a depth stop in accordance with the present invention as it would fit on a typical drill with parts of the drill not shown for clarity in identifying the depth stop.
Figure 1B:
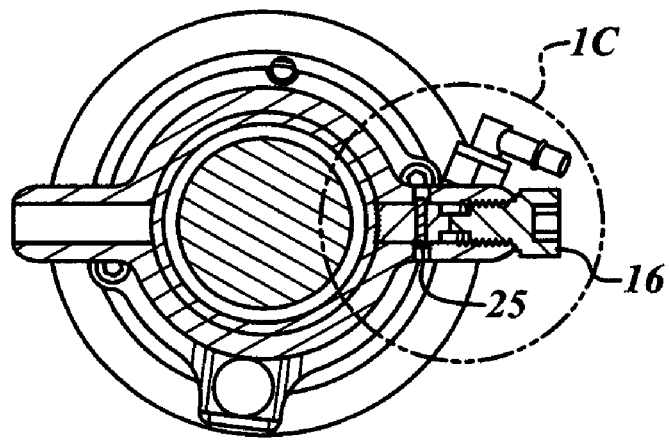
Figure 1C:
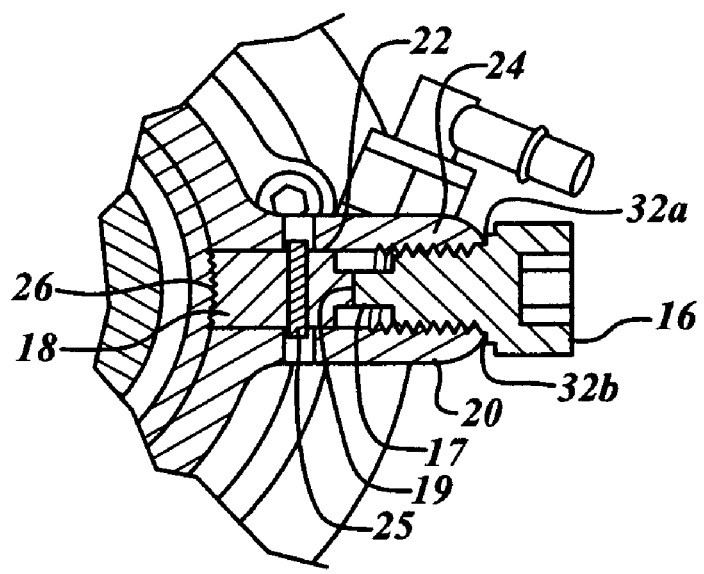
FIG. 1c is a detail view of the circled section labeled C of FIG. 1b.
Figure 2:
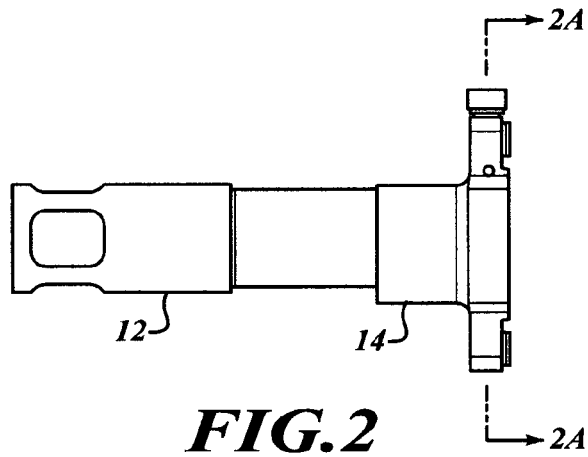
FIG. 2 is an elevation view of the depth stop of the present invention.
Figure 2A:
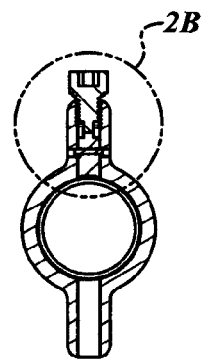
FIG. 2a is a cross sectional view taken through line A-A of FIG. 2.
Figure 2B:
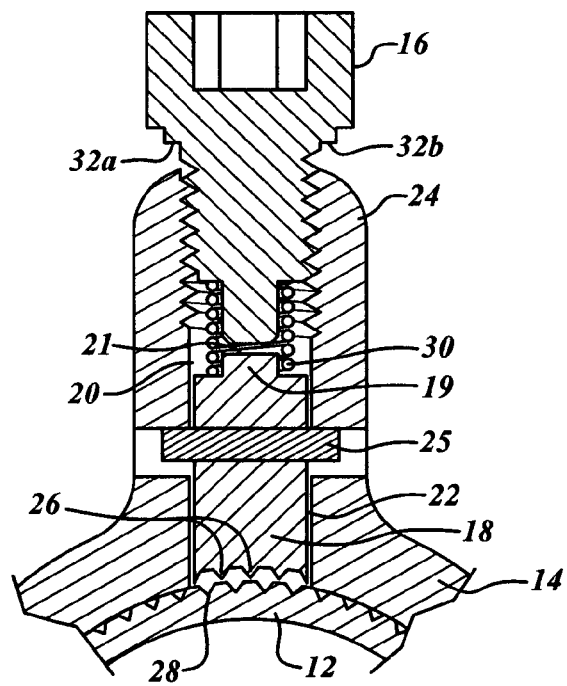
FIG. 2b is a detailed view of circular section B of FIG. 2a showing the configuration of the device when the inner sensing sleeve can be adjusted.
Figure 3:
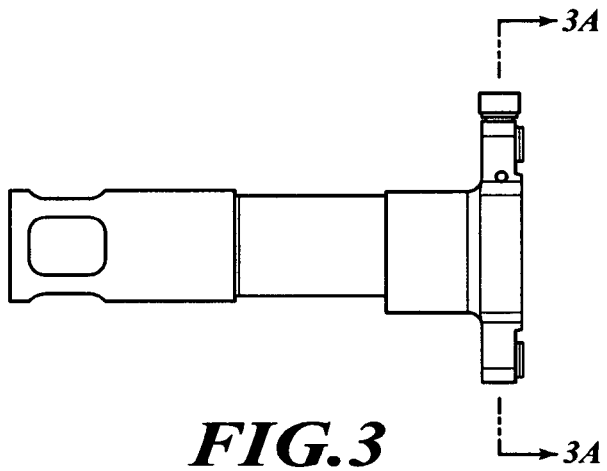
FIG. 3 is an elevation view of the depth stop of the present invention similar to FIG. 2.
Figure 3A:
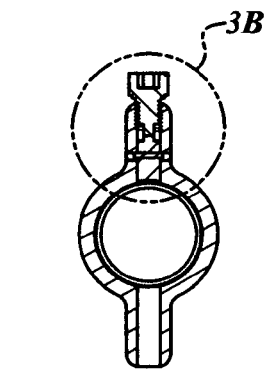
FIG. 3a is a sectional view taken through line A-A of FIG. 3.
Figure 3B:
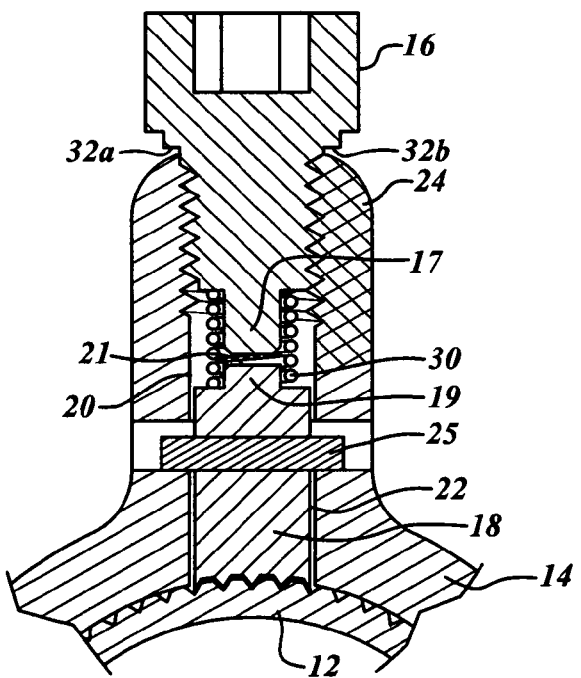
FIG. 3b is a detailed view of circular section B of FIG. 3a showing the configuration of the depth stop of the present invention when the inner sensing sleeve is locked in place.

Referring to the Figures, especially FIGS. 1a-1c, the depth stop in accordance with the present invention can be described. In FIGS. 1a-c, parts of the drill have been omitted to more clearly distinguish the depth stop itself. FIG. 1a shows a depth stop assembly, generally designated as 10, having an inner sensing sleeve 12 and an outer sensing sleeve 14. Inner sensing sleeve is threaded into outer sensing sleeve 14 with fine pitched thread. The inner sensing sleeve 12 has external threads which match internal threads of outer sensing sleeve 14. Inner sensing sleeve 12 can be adjusted relative to outer sensing sleeve 14 by rotation of the inner sensing sleeve 12 while keeping the outer sensing sleeve fixed. A lock screw 16 and sensing sleeve anti-rotational member 18 are used to hold the inner sensing sleeve 12 in position relative to the outer sensing sleeve 14. Lock screw 16 has a projection 17 extending axially from one end, and sensing sleeve anti-rotational member 18 also has a projection 19 extending axially from one end toward the lock screw. More details of this arrangement to hold the inner sensing sleeve 12 relative to the outer sensing sleeve 14 will be disclosed subsequently. A partially threaded aperture 20 is provided and extends in the radial direction within the outer sensing sleeve 14. The aperture 20 receives the sensing sleeve anti-rotational member 18 in its non threaded portion, designated as numeral 22, and the lock screw in its thread portion, designated as 24. A roll pin 25 is provided which secures the sensing sleeve anti-rotational member 18 to the outer sensing sleeve 14. The sensing sleeve anti-rotational member 18 is received in this manner to prevent inadvertent loss of that part from the depth stop assembly if lock screw 16 is removed completely from the partially threaded aperture 20.

Referring now to the FIGS. 2a-c, and 3a-c particularly, it can be seen that sensing sleeve anti-rotational member 18 has teeth 26 extending axially from one end opposite the projection 19. The teeth 26 engage in longitudinal grooves 28 of inner sensing sleeve 12. Grooves 28 partially extend over the outer surface of inner sensing sleeve 12. The teeth 26 of sensing sleeve anti-rotational member 18 when engaged in longitudinal grooves 28 of inner sensing sleeve 12, can hold the inner sensing sleeve 12 in place relative to the outer sensing sleeve 14. A spring 30 is provided which fits between the end of the lock screw 16 and the end of the sensing sleeve anti-rotational member 18 closest to the lock screw 16 over projection 17 of the lock screw 16, and over projection 19 of sensing sleeve anti-rotational member 18. In this configuration, as the lock screw 16 is rotated inwardly, the spring 30 urges sensing sleeve anti-rotational member 18 toward the inner sensing sleeve 12 until the teeth 26 of sensing sleeve anti-rotational member 18 engage the grooves 28 of inner sensing sleeve 12. When the lock screw is 16 is fully tightened, teeth 26 of sensing sleeve anti-rotational member 18 cannot disengage from grooves 28 of the inner sensing sleeve 12. The inner sensing sleeve 12, therefore, cannot rotate and is positively locked into position. The shoulders 32a, 32b, of lock screw 16, when lock screw 16 is fully tightened, rest on the ends of the threaded portion 24 of the partially threaded aperture 20. Further, when the lock screw 16 is fully tightened, a gap 21 exists between the projection 17 of the lock screw 16 and the projection 19 on the end of the sensing sleeve anti-rotational member 18. This gap 21 is small enough to prevent the teeth 26 of sensing sleeve anti-rotational member 18 from disengaging from grooves 28 of inner sensing sleeve 12 so that the sensing sleeve anti-rotational member 18 is locked in position. The gap 21 is always present, regardless of the position of the lock screw 16, effectively preventing lock screw 16 from directly pushing on sensing sleeve anti-rotational member 18. The force transmitted by sensing sleeve anti-rotational member 18, therefore, to the inner sensing sleeve 12 is always less than the force necessary to deflect or damage the inner sensing sleeve 12. The depth stop assembly 10, has a way to avoid damage to the inner sensing sleeve 12 regardless of the operator's handling of the lock screw 16. It is impossible to over-tighten the lock screw 16 and thereby damage the inner sensing sleeve 12. The countersink depth is established with a minimal force on the inner sensing sleeve 12 resulting in countersink depth accuracy over time.

Figure 4A:
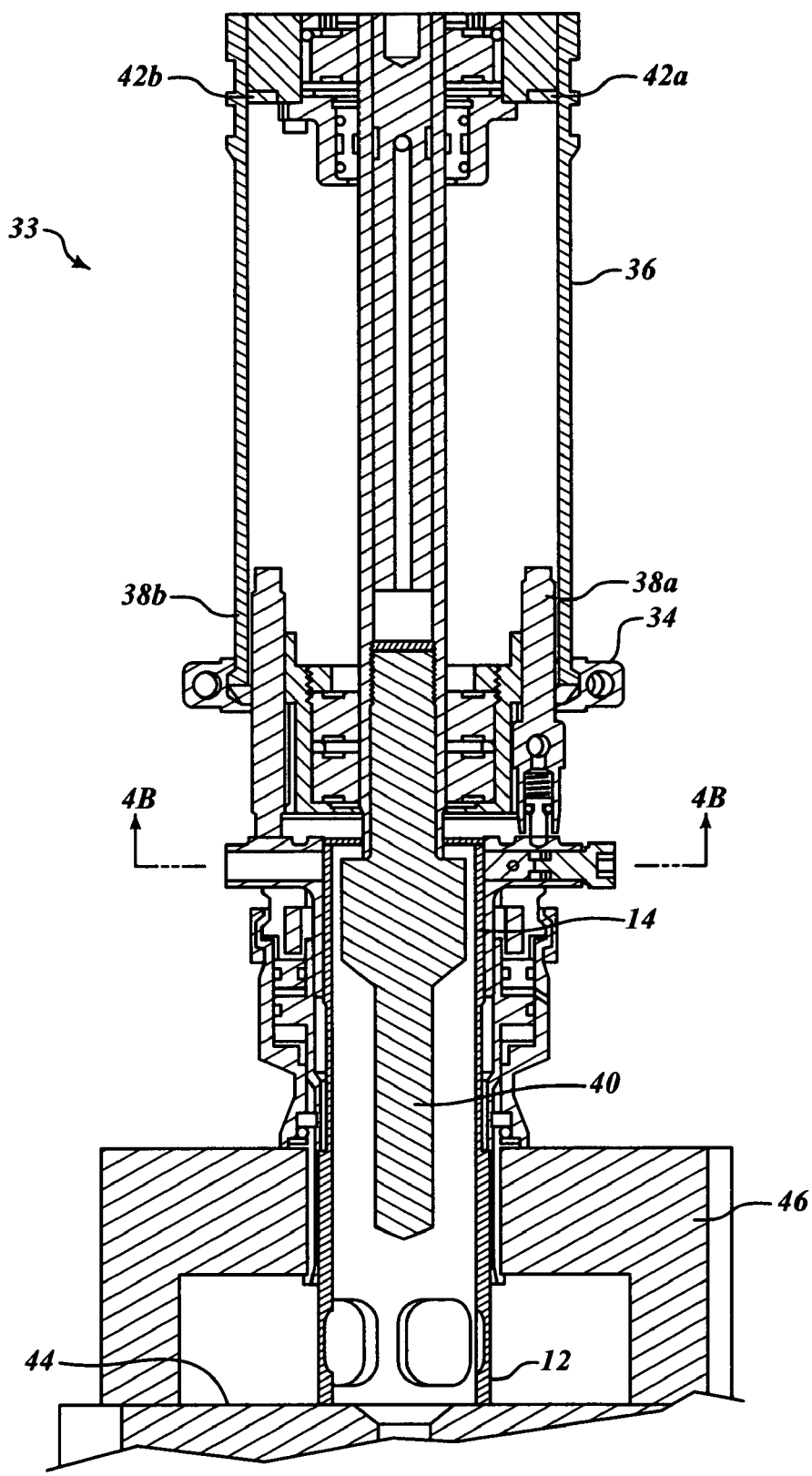
FIG. 4a is an elevation view partially in cross section of a depth stop in accordance with the present invention as attached to a drill.
Figure 4B:
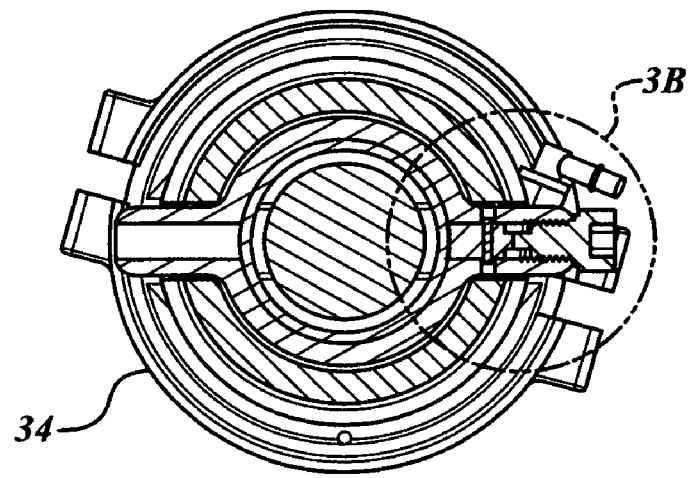
Figure 4C:
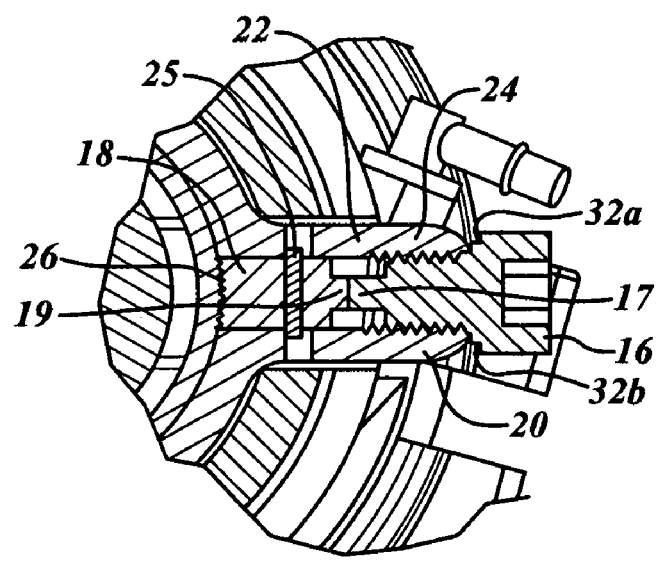
FIG. 4c is a detailed view of section C of FIG. 4b.

FIG. 4a (with more drill parts shown relative to FIG. 1a) shows the depth stop assembly 10 attached to a typical drill, generally designated as 33, used to make countersunk holes in airplane parts. The depth stop assembly 10 is clamped by clamping band 34 to the drill housing 36. Depth stop pins 38a, 38b, extend from the depth stop assembly 10 and fit within suitable cavities within the drill housing 36. The drill bit 40 will be extended from drill housing 36 to drill a hole until shoulders 42a, 42b, within the drill housing 36 contact depth stop pins 38a, 38b respectively. The depth of the drilled hole can by regulated by extending inner sensing sleeve 12 relative to outer sensing sleeve 14. When the lock screw 16 is backed off, and the teeth 26 are not fully engaged in grooves 28 of the inner sensing sleeve 12, slight contact between the teeth 26 of sensing sleeve anti-rotational member 18 and the grooves 28 of inner sensing sleeve 12 occurs. When the inner sensing sleeve 12 is rotated relative to the outer sensing sleeve 14, this slight contact of teeth 26 with grooves 28 creates an audible "click" due to the spring 30. The spacing of grooves 28 of inner sensing sleeve 12 and teeth 26 determine the distance the inner sensing sleeve 12 travels for each click heard. If the teeth 26 and the grooves 28 are spaced relatively widely, a longer travel of inner sensing sleeve 12 relative to outer sensing sleeve 14 will occur and the inner sensing sleeve 12 will extend farther outwardly from the depth stop assembly 10. In a preferred embodiment of the present invention, the teeth 26 of the sensing sleeve anti-rotational member 18 and the grooves 28 of the inner sensing sleeve 12 will be configured so that an audible click occurs of each 7.5 micron change in countersink depth. This audible cue is helpful to the operator in arriving at the final desired depth of countersink.

In operation, the depth stop assembly would be fastened to a drill 33 by clamping band 34 as shown in FIG. 4a. The depth stop assembly would rest on a work piece designated as 44 extending through a template 46. As shown in FIG. 4a, the template 46 also rests on the work piece 44. The operator would proceed by first drilling a hole in the work piece with the countersink drill bit 40. The drilled hole would then be measure, and the inner sensing sleeve 12 rotated relative to the outer sensing sleeve 14 to precisely determine the depth of the countersunk hole. As mentioned previously, an audible click will occur at every 7.5 microns change in depth to assist the operator in arriving at the exact desired depth of countersink. The inner sensing sleeve 12 can then be fixed in place by tightening the lock screw 16. Once the lock screw is tightened, the inner sensing sleeve 12 is fixed in place and the hole can be drilled with precision. The drill bit 40 will extend from the drill housing 36 until depth stop pins 38a, 38b, contact shoulders 42a, 42b, respectively, of drill 33. The depth of the countersunk hole will be determined by the depth stop assembly 10. It should be noted that the inner sensing sleeve 12, outer sensing sleeve 14, and depth stop pins 38a, 38b are all "free floating" and reference only the surface of the work piece 44 for depth of countersink, without being effected by any tooling or work piece 44 deflection during the drilling operation.

This invention may be embodied in other forms without departing form the spirit or essential characteristics thereof. The present embodiments are, therefore, to be considered in all respects as illustrative and not restrictive, the scope of the invention being indicated by the appended claims rather than the foregoing description, and all change which comes within the meaning and range of equivalency of claims is intended to be embraced therein.

What is claimed is:

1. A depth stop for use with a drill having a drill bit extending therefrom for drilling a hole in a workpiece comprising:
   a) first tubular member, said first tubular member having a forward end closer to the workpiece when the drill is in use, and a rearward end closer to the drill, said first tubular member having grooves therein, and adapted to receive the drill bit of the drill;
   b) a second tubular member outside of said first tubular member threadably engaging said first tubular member, and having a forward end closer to the workpiece when the drill is in use, and a rearward end closer to the drill, said second tubular member having an internally threaded aperture extending outwardly from its rearward end;
   c) a lock screw having external threads adapted to be received by said threaded aperture of said second tubular member; and
   d) a sensing sleeve anti-rotational member having teeth extending axially therefrom and adjacent said lock screw, said sensing sleeve anti-rotational member and said lock screw having a spring therebetween, whereby rotational movement of said lock screw to a locked position causes axial movement of said sensing sleeve anti-rotational member until said teeth of said sensing sleeve anti-rotational member engage said grooves of said first tubular member, thereby locking said first tubular member in a fixed position relative to said second tubular member, and limiting the travel of the drill bit into the workpiece when the forward end of said first tubular member contacts the workpiece.

2. The apparatus of claim 1 wherein rotational movement of said lock screw to an open position causes axial movement of said sensing sleeve anti-rotational member until said teeth of said sensing sleeve anti-rotational member disengage from said grooves of said first tubular member enough to allow rotational movement of said first tubular member relative to said second tubular member.

3. The apparatus of claim 2 wherein said first tubular member can be rotated relative to said second tubular member when said lock screw is in an open position.

4. The apparatus of claim 3 wherein rotation of said first tubular member a predetermined amount relative to said second tubular member produces an audible click.

5. The apparatus of claim 4 wherein each audible click produced when said first tubular member is rotated relative to said second tubular member when said lock screw is in an open position signals a change in the allowable depth of the drill bit into the workpiece when the drill is in use.

6. The apparatus of claim 5 wherein the amount of depth into the workpiece changes less than 10 microns for each audible click.

7. The apparatus of claim 1 wherein said lock screw has a shoulder which limits the depth said lock screw travels within said threaded aperture of said second tubular portion.

8. The apparatus of claim 1 wherein the maximum possible force applied to said first tubular member by said sensing sleeve anti-rotational member when said lock screw is in a locked position is limited to a force less than the force needed to cause deflection of said first tubular member.

9. The apparatus of claim 1 wherein a gap exists between said lock screw and said sensing sleeve anti-rotational member, said gap being small enough so that the teeth of said sensing sleeve anti-rotational member cannot disengage from the grooves of said first tubular member when said lock screw is in a locked position.

* * * * *